United States Patent
Whitcomb (10) Patent No.: US 7,481,025 B2
(45) Date of Patent: Jan. 27, 2009

(54) METHOD AND CONTAINER FOR GROWING TRANSPLANTABLE PLANTS

(75) Inventor: Carl Whitcomb, Stillwater, OK (US)

(73) Assignee: Lacebark, Inc., Stillwater, OK (US)

( * ) Notice: Subject to any disclaimer, the term of this patent is extended or adjusted under 35 U.S.C. 154(b) by 657 days.

(21) Appl. No.: 10/446,987

(22) Filed: May 28, 2003

(65) Prior Publication Data

US 2004/0237389 A1 Dec. 2, 2004

(51) Int. Cl.
*A01G 13/02* (2006.01)
*A01G 9/02* (2006.01)
*B65D 85/50* (2006.01)

(52) U.S. Cl. .................. 47/32.7; 47/32.8; 47/65.5; 47/66.1; 206/423

(58) Field of Classification Search .................. 47/32.7, 47/32.8, 65.5, 66.1, 67, 68; 241/168, 169; 206/423; 220/601, 661, 676
See application file for complete search history.

(56) References Cited

U.S. PATENT DOCUMENTS

| | | | |
|---|---|---|---|
| 754,948 A | 3/1904 | White | |
| 1,011,445 A | 12/1911 | Killion | |
| 1,845,522 A * | 2/1932 | Rowley | 241/168 |
| 2,405,056 A * | 7/1946 | Rosenbloom | 241/273.1 |
| 2,615,486 A * | 10/1952 | Marcus | 241/168 |
| 2,829,742 A | 4/1958 | Wallace | |
| 3,291,437 A | 12/1966 | Bowden et al. | |
| D215,122 S * | 9/1969 | Satake | D7/369 |
| 3,951,294 A | 4/1976 | Wilson | |
| 4,442,628 A | 4/1984 | Whitcomb | |
| 4,497,132 A | 2/1985 | Whitcomb | |
| 4,510,712 A | 4/1985 | Whitcomb | |
| 4,574,522 A | 3/1986 | Reiger et al. | |
| 4,716,680 A | 1/1988 | Whitcomb et al. | |
| 4,730,953 A | 3/1988 | Tarko | |
| 4,753,037 A | 6/1988 | Whitcomb | |

(Continued)

FOREIGN PATENT DOCUMENTS

AU   A-79238/91   *   1/1992

(Continued)

OTHER PUBLICATIONS

Carl Erwin Whitcomb, "Effects of Root Competition Between Trees and Turfgrass", An Abstract of a Dissertation submitted to the Graduate Faculty in Partial Fulfillment of The Requirements for the Degree of Doctor of Philosophy, p. 1-3, 52.

(Continued)

*Primary Examiner*—Peter M Poon
*Assistant Examiner*—Kristen C Hayes
(74) *Attorney, Agent, or Firm*—Jeffrey L. Streets; Streets & Steele (57) ABSTRACT

An apparatus bounds and retains the medium in which a transplantable plant is grown, and promotes the production of lateral root tips by such a plant at all levels in the growth medium. The apparatus includes a sheet having a plurality of hollow protuberances formed with proximal protuberance openings that communicate with distal protuberance openings. The protuberances provide pathways that mimic the natural tendency of the plant roots, so as to decrease the likelihood of the root tips evading the protuberances and promote root-tip growth towards the distal protuberance openings whereby air-root pruning is assured.

73 Claims, 3 Drawing Sheets

U.S. PATENT DOCUMENTS

| | | | | |
|---|---|---|---|---|
| 4,920,695 | A | * | 5/1990 | Garden .......................... 47/83 |
| 4,939,865 | A | | 7/1990 | Whitcomb et al. |
| 5,099,607 | A | | 3/1992 | Lawton |
| 5,241,784 | A | | 9/1993 | Henry |
| 5,301,465 | A | | 4/1994 | Caferro |
| 5,327,679 | A | * | 7/1994 | Hawthorne .................... 47/73 |
| 5,557,886 | A | | 9/1996 | Whitcomb |
| 5,768,825 | A | | 6/1998 | Reiger |
| 6,195,938 | B1 | | 3/2001 | Kay |
| 6,311,443 | B1 | | 11/2001 | Allazetta |
| 6,453,610 | B2 | | 9/2002 | Tonkin et al. |
| 6,481,593 | B2 | | 11/2002 | Banhagel |
| 6,862,840 | B1 | * | 3/2005 | Single ........................ 47/32.7 |
| 6,874,278 | B2 | * | 4/2005 | Felknor et al. ................ 47/67 |

FOREIGN PATENT DOCUMENTS

| | | | |
|---|---|---|---|
| DE | 10213969 C1 | * | 5/2003 |
| JP | 2000152720 A | * | 6/2000 |
| WO | WO 97/00005 | * | 1/1997 |
| WO | WO 97/21339 | * | 6/1997 |
| WO | WO 01/35722 A1 | * | 5/2001 |

OTHER PUBLICATIONS

Carl E. Whitcomb, Eliot C. Roberts, and Roger Q. Landers, A Connecting Pot Technique For Root Competition Investigations Between Woody Plants Or Between Woody and Herbaceous Plants, Ecology, vol. 50, No. 2, Early Spring 1969, p. 326-328.

Carl E. Whitcomb and Eliot C. Roberts, "Competition Between Established Tree Roots and Newly Seeded Kentucky Bluegrass", Agronomy Journal, vol. 65, Jan.-Feb. 1973, p. 126-129.

Ralph Reiger and Carl E. Whitcomb, "A Root Control System for Growing and Transplanting Trees", Ag Exp Sta Report, p. 843, 1983.

Carl Whitcomb, "Fabric liners to stop root circling in containers", unavailable paper published in 1983, but referenced on, p. 341-342 of book by Carl Whitcomb, Plant Production in Containers II, 2003.

Carl E. Whitcomb, "Root Development of Trees Grown in Field-Grow Fabric Containers Following Transplanting", Okla. State U. Ag Exp. Sta Research Report, p. 872, 1985.

Paper: Published in 1968 or 1969 copy unavailable. Subject: Using quart milk cartons with or without bottoms removed for growing tree seedlings. The milk cartons were positioned on a raised wire frame to prevent roots from growing into the soil below. This may have been the first situation where air-root-pruning occurred.

Jim Ward and Carl E. Whitcomb, Nursery Problems Solutions Through Research, Jun. 21, 1972, Experiment #13, "Effects of Time of Potting and Root Pruning on Growth and Root Distribution of Loquat Seedlings", p. 24-25.

Carl E. Whitcomb, "Growth of Carissa Grandiflora 'Boxwood Beauty' in varying media, containers and micronutrient levels", 9 pages, circa 1971.

Carl E. Whitcomb, Experiment #14, "Effects of Container Sidewall Porosity, Growing Media and Presence or Absence of Micronutrient Fertilizer on Root and Top Growth of Carissa Grandiflora Var. Boxwood Beauty", Nursery Problems Solutitions Through Research, Jun. 5, 1971.

Randy E. Davis and Carl E. Whitcomb, "Effects of Propagation Container Size On Development of High Quality Seedlings", Reprint from The International Plant Propagators' Society, vol. 25, 1975.

Robert S. Birchell and Carl E. Whitcomb, "Effects of Container Deisgn on Root Development and Regeneration", Nursery Research Field Day, Ag Exp Sta, OK State Univ, Oct. 1977, Research Report p. 760.

Robert D. Hathaway and Carl E. Whitcomb, "The Effects of Root Malformation During Propagation on Growth and Survival of Bur Oak", Nursery Research Field Day, Ag Exp Sta, OK State Univ, Oct. 1978, Research Report p. 777.

Sancho Dickinson and Carl E. Whitcomb, "Effects of Container Design on Root Quality", Nursery Research Field Day, Ag Exp Sta, OK State Univ, Oct. 1978, Research Report p. 777.

Elizabeth Williams and Carl E. Whitcomb, "Effects of Growing Media and Container Design on Growth of Tree Seedlings", Nursery Research Field Day, Ag Exp Sta, OK State Univ, Oct. 1979, Research Report p. 791.

John D. Gibson and Carl E. Whitcomb, "Producing Tree Seedlings in Square Bottomless Containers", Ornamentals South, Aug. 1980, p. 12-15.

Carl E. Whitcomb, "Effects of Container and Production Bed Color on Root Temperatures and Plant Growth", Nursery Research Field Day, Ag Exp Sta, OK State Univ, Oct. 1980, Research Report p. 803.

Steve Wall and Carl E. Whitcomb, "A Comparison of Commercial Containers for Growing Tree Seedlings", Nursery Research Field Day, Ag Exp Sta, OK State Univ, Oct. 1980, Research Report p. 803.

Carl E. Whitcomb "Growing Tree Seedlings in Containers", Bulletin 755 Jan. 1981 Agricultural Experiment Station Div of Ag, OK State Univ, p. 18.

Carl E. Whitcomb, "An "Easy" Way to Grow Specimen Trees In The Field", Nursery Research Field Day, Ag Exp Sta, OK State Univ, Oct. 1981, Research Report p. 818.

Carl E. Whitcomb, "A Vertical Air-Root-Pruning Container", Reprints- vol. 31 International Plant Propagators Society Combined Proceedings for 1981, p. 591-596.

Carl E. Whitcomb, "Inproving Root System Quality", Reprint from Research Report p. 829 of the OK Ag Exp. Sta. Oct. 1982.

Ben Davis III and Carl E. Whitcomb, "Growing Pecan Seedlings in Containers", Reprint from Research Report p. 829 of the OK Ag. Exp. Sta. Oct. 1982.

Robert D. Hathaway and Carl E. Whitcomb, Nutrition and Performance of Container-Grown Japanese Black Pine Seedlings, J. Environ. Hort. 2 (1):9-12. Mar. 1984.

Robert D. Hathaway and Carl E. Whitcomb, "Container-Grown Pecan Seedlings Good Nutrition, Root Pruning Technique to Get Seedlings Off to Quick Start", Pecan South, Jan. 1985, p. 14-19.

Carl E. Whitcomb, Roots for The Future, The International Plant Propagators' Society, Combined Proceedings vol. 39, 1989, p. 170-173.

Dr. Carl Whitcomb, "The Rootmaker Container", Florida Nurseryman Oct. 1989, p. 23-29.

"Container designed to aid plant's root development", Nursery Manager,Apr. 1991, p. 22.

Carl E. Whitcomb, "Top Ten PoInts of Plant Propagation", Combined Proceedings International Plant Propagators' Society, vol. 48, 1988, p. 558-561.

Carl E. Whitcomb, "Avoiding the Staking Delemma", published in the International Plant Propagators Soc. Proceedings, vol. 50, 2000.

Carl Whitcomb, "Seedling Development: The Critical First Days ©", Combined Proceedings International Plant Propagators' Society, vol. 51, 2001 p. 610-614.

Carl E. Whitcomb, Containers vs. Poly Bags—Which are better?, Reprinted from the Jan. 1, 1983, container production special issue of American Nurseryman.

Carl E. Whitcomb and Jerry D. Williams, "Stair-step Container for Improved Root Growth", HortScience 20(1) 66-67, 1985.

Dr. C. E. Whitcomb, "Effects of pot sizes on rooting of juniper cuttings", Jan. 15, 1974, p. 15, 73-74.

James D. Ward and Carl E. Whitcomb, "Nutrition of Japanese Holly during Propagation and Production", J. Amer. Soc. Hort. Sci 104(4) p. 523-526. 1979.

Carl E. Whitcomb, "Effect of Micronutrient Nutrition During Propagaton on Container Plant Production", Reprints vol. 30 International Plant Propagators' Society Combined Proceedings for 1980, p. 468-473.

Carl E. Whitcomb, Allan Storjohann and William D. Warde, "Micromax—Micronutrients for Improved Plant Growth", Reprints vol. 30 International Plant Propagators' Society Combined Proceedings for 1980, p. 462-467.

Carl E. Whitcomb, Ralph Reiger and Mike Hanks, "Growing Trees In Wire Baskets", Journal of Ariculture 7 (6): Jun. 1981, p. 158-160.

Frank E. Babcock and Carl E. Whitcomb, "N-P-K Effects on Tree Seedling Growth", Agriculture Exp. Sta. OK State University Research Report p. 843, 1983.

Carl E. Whitcomb, "Why Large Trees Are Difficult To Transplant", Journal of Arboriculture 9(2): Feb. 1983, p. 57-58.

Michael Carney and Carl E. Whitcomb, "Effects of 2 Slow-Release Fertilizers on the Propagation and Subsequent Growth of 3 Woody Plants", J. Environ. Hort. 1(3):p. 55-58, Sep. 1983.

Bonnie Lee Appleton and Carl E. Whitcomb, "Effects of Container Size and Transplanting Date on The Growth of Tree Seedlings", J. Environ. Hort. 1(4):p. 89-93. Dec. 1983.

C. Chris Threadgill, Carl e. Whitcomb and Ronald McNew, "Effects of Propagation Container Dimensions and Media on The Growth of 4 Nursery Crops", J. Environ. Hort. 3(3):p. 126-131 Sep. 1985.

Whitcomb, Carl E., "Plant Production in Containers", Copyright 1984 by Carl E. Whitcomb, revised 1988.

Whitcomb, Carl E. "Plant Production in Containers II", Copyright 1984 by Carl e. Whitcomb, revised 1988 and 2003.

Carl Whitcomb PhD., "The Obsolete Taproot"; Landscape Contractor vol. 7, #8, pp. 22, 66, 67, Aug. 2004.

Carl E. Whitcomb and Andy C. Whitcomb; "Solutions for Pot-in-Pot Root Escape, Root Circling and Heat Shock at Harvest"; The International Plant Propagators Society Proceedings, 2004, vol. 54.

* cited by examiner

METHOD AND CONTAINER FOR GROWING TRANSPLANTABLE PLANTS

BACKGROUND OF THE INVENTION

1. Field of the Invention

The present invention relates generally to a container for growing plants, and, more particularly, to a container for growing plants such as trees and shrubs for transplanting.

2. Description of the Prior Art

Plants, such as trees and shrubs, which are intended to be transplanted are commonly grown above ground in containers. Such containerized plants can be grown at a faster rate than those grown in the ground, they are more easily tended, and because the roots of the plants are not severed when the plants are transplanted, transplanting is more often successfully accomplished.

Various types of containers have been used for growing plants, by retaining and bounding the soil and roots of plants prior to transplanting. For example, metal cans and cylindrical plastic containers with holes in the bottoms were among the first plant growing containers used.

When a plant seed germinates the first or primary root, often referred to as a taproot, plunges downward in an effort to secure the new plant in place and to secure access to moisture and nutrients. The taproot on some plant species extends only a few inches while in others the taproot extends 10 feet or more if environmental conditions in the soil allow.

Figures 1, 2A, 2B:
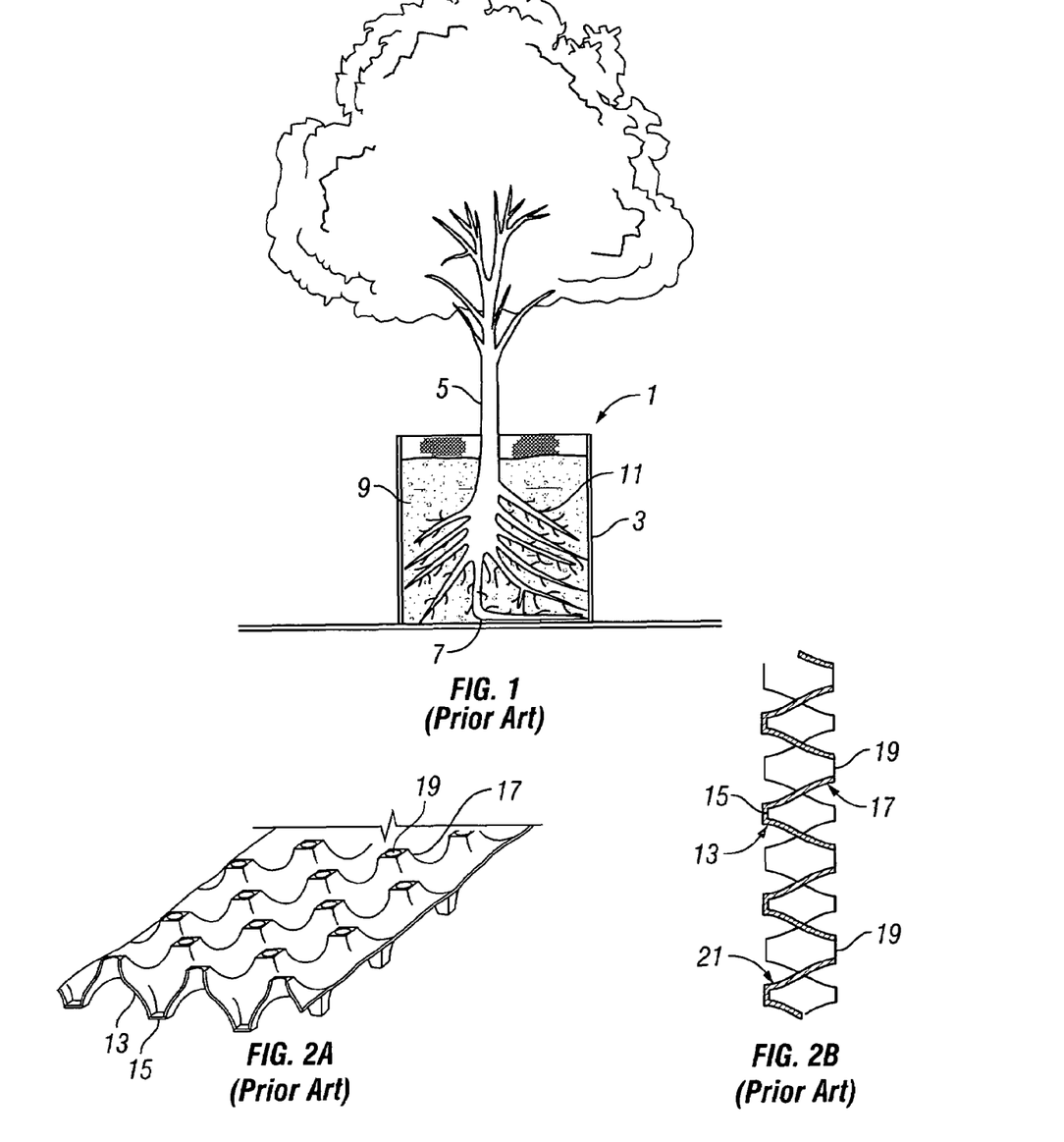
FIG. 1 is an elevational view, partially in cross-section, of a container for growing a transplantable plant as is generally known in the prior art.
FIG. 2A is a perspective view of a portion of a particular prior art container for growing a transplantable plant.
FIG. 2B is a cross-sectional view of the prior art container section shown in FIG. 2A.

A smooth-walled conventional container for growing transplantable plants is illustrated in FIG. 1 and generally designated by the numeral 1. The container 1 is comprised of a cylindrical body having a continuous arcuate sidewall 3 for bounding and retaining a transplantable plant 5 having taproot 7 in a volume of soil or other growth medium 9. The taproot 7 grows until it reaches the bottom of the container, and then changes direction in response to impacting the container while continuing to grow until circling becomes physically restricting to growth.

Once the taproot stops growing or extending, the apical dominance of its root tip is lost and the development of some secondary lateral rooting occurs. The secondary roots are much less influenced by gravity and extend more horizontally, although still partially downwardly, in direction. When such roots contact the sides of a plant container, unless trapped or air-pruned they turn and grow downwardly in a spiral path along the sides to the bottom of the container where they continue to grow in a circular pattern. As further roots form off the secondary roots, called tertiary roots, these roots have an even greater horizontal tendency, but still retain a modest downward tendency and often end up in circular patterns at the bottom of a smooth inner-walled, conventional container as well.

Plants that are transplanted with root growth that extends downwardly and concentrated at the bottom of a container, as described above, suffer because the roots provide little or no lateral anchorage of the plant, and the tips of the roots are at a depth in the soil where aeration is less favorable. In addition, the downwardly-directed roots are intermingled with each other and as they increase in diameter with age, they exert pressure on one another that can restrict the normal flow of water and nutrients through the roots.

Cylindrical containers having holes in the sides to inhibit such concentrated spiral and circular root growth have been utilized in the art. The side holes or openings function to cause air-pruning of the roots, a phenomenon in which the growth of a root stops when the root extends into the vicinity of an opening that is exposed to the atmosphere, essentially because the atmosphere cannot provide the requisite moisture necessary for continued growth. While the use of cylindrical containers with side holes reduces the incidence of spiraled and circled roots, some spiraling and circling can still take place because the roots are not positively directed towards the side holes and can evade the side holes by ricocheting off the inner surfaces of the container sides between the holes.

Transplantable landscape plants have also been grown in square, bottomless containers placed on wire screens whereby roots reaching the bottom of the container are air-pruned. Most of the resulting root tips end up at the bottom of such containers, reducing lateral anchorage. Furthermore, the requirement of placing the containers on wire screen surfaces generally makes the practice cumbersome and uneconomical.

Other containers have been developed (see, e.g., U.S. Pat. No. 5,099,607 issued on Mar. 31, 1992) that employ a plurality of complementary outwardly and inwardly projecting regions. A section of such a container is shown in FIGS. 2A-2B. The inwardly projecting regions 13 terminate in closed tips 15 and the outwardly projecting regions 17 each have an opening 19 at its tip such that when roots are guided to the openings, the tips of the roots are dehydrated by exposure to air and effectively air-root pruned, thereby stimulating root branching. These container designs work fairly well, but also exhibit some shortcomings. In particular, it has been observed that numerous roots of a plant disposed in such containers will evade the air-root-pruning openings, in part, because in use the outwardly projecting regions 17 have lower inner surfaces 21 that slope upwardly (i.e., upwardly and outwardly) and are therefore substantially normal to the naturally-occurring paths—outwardly and downwardly—that a large majority of the roots will follow. The root tips encountering such upwardly-sloping surfaces 21 tend to be deflected or ricocheted away from the pruning openings 19.

It is therefore highly desirable that each root of a transplantable plant that would otherwise extend outwardly and contact the sidewall of a plant container be guided to an opening for air-root-pruning and not be allowed to ricochet off the container sidewall and extend down the sidewall or horizontally around the container.

It is further desirable to provide an improved container for growing transplantable plants, whereby spiral and circular root growth is reduced or prevented, and the development of lateral root tips (axially) along and (circumferentially) around the sides of the container is maximized.

It is still further desirable to provide a sheet that is formable into an improved plant growth container wherein the production of lateral root tips is promoted at all levels in a plant growth medium and the root tips quickly grow in all natural directions, whereby the plant is quickly laterally anchored when transplanted and maximum water and nutrients are absorbed.

SUMMARY OF THE INVENTION

One embodiment of the present invention provides an apparatus for bounding a medium in which a transplantable plant is grown, i.e., an apparatus for containing a transplantable plant. The term "transplantable" is generally used herein to refer to a plant that is able to be transplanted easily, but does not dictate that the plant ever actually be transplanted. The apparatus promotes air-root pruning and includes a sheet having a plurality of hollow protuberances. The term "sheet" is used herein in a conventional sense, i.e., to mean something that is thin in comparison to its length and breadth, but not necessarily having a uniform cross-section or thickness. Nor is the term "sheet" intended to preclude thin materials that have indefinite lengths and are rolled in a cylindrical shape for convenient storage and dispensing. It is indeed preferable that a sheet according to the present invention is formed of a thin, flexible plastic material having an elongated length to facilitate rolling in cylindrical fashion, whereby a plurality of sheets having shorter lengths may be cut from the roll as needed to contain transplantable plants. The term "protuberance" is also used herein in a generally conventional sense to mean something that thrusts outwardly from a surrounding or adjacent surface.

The sheet protuberances are formed with a proximal opening that communicates with a distal opening. Each protuberance generally slopes downwardly and outwardly when the sheet is positioned upright. Preferably, the center of the proximal opening is positioned higher than the center of the distal opening when the sheet is positioned upright, ensuring that the pathway provided by the protuberances mimics the natural distribution tendency of plant roots.

It is also preferable that the proximal opening of each protuberance is larger than the distal opening thereof, so as to assist in directing root extension towards the distal opening.

It is also preferable that each of the protuberances narrows in width or cross-section from the proximal opening to the distal opening, again for assisting in directing roots towards the distal opening, in funnel-like fashion. This narrowing may be in a substantially linear fashion, such as in conically-shaped or pyramidally-shaped protuberances. This narrowing may also be substantially curvilinear, such as in a hemispherically-shaped protuberances.

The openings of the protuberances may also employ different shapes. For example, the proximal opening may be substantially rectangular, substantially circular, or irregular in shape. Similarly, the distal opening may be substantially rectangular, substantially circular, or irregular in shape.

The protuberances may also employ different profiles. The term "profile" is used herein generally to mean the defining or outlining wall portions of a protuberance when viewed in cross-section or from the side. For example, "lower profile" means the wall portion of a protuberance that defines its lower outline as seen from the side. In various embodiments, the protuberances may have a lower profile that is substantially horizontal, a lower profile that slopes slightly upwardly at an angle that exceeds 90 degrees measured from the plane of the sheet, or some combination thereof. Furthermore, in some embodiments, the protuberances may have an upper profile that slopes downwardly at an angle in the range of approximately 110 to 150 degrees measured from the plane of the sheet, or some combination thereof.

As mentioned above, it is preferred that the sheet is sufficiently flexible to be formed in a generally cylindrical shape. It is further preferred that the sheet be either: (a) provided with a fastener(s) to secure the edges of the sheet together when it's formed in the generally cylindrical shape; or (b) seamlessly formed in a generally cylindrical shape, such as by injection molding. The fasteners may be integral with the sheet or provided as a separate component coupled to the sheet.

The plurality of protuberances on the sheet preferably forms a lattice over at least a substantial portion of the sheet. It is further preferred that the protuberances are arranged in a close-packed configuration, for example, a configuration that employs little or no spacing between adjacent protuberances, which reduces the presence of areas in the sheet that might promote root deflection or ricocheting away from the protuberances.

In one embodiment, the sheet is formed in a generally cylindrical shape by joining the edges of the sheet together. For example, this may be achieved by overlapping one of the edges over the other of the edges, and securing the one edge over the other edge along the length of the edges by using rivets, self locking rivets, or other conventional fasteners. Preferably, the overlapping of the edges is guided by the engagement of a lattice of root-directing protuberances in the region adjacent the one edge with a complementary lattice of root-directing protuberances in the region adjacent the other edge. In a further alternative, the edges of the sheet are joined together by joints formed in the edges, such as mortise and tenon joints, snaps, and hooks.

It is further preferred that the sheet is naturally planar, and generally defines a plane in which a portion of each of the protuberances lies. Thus, in one embodiment, the sheet defines a plane in which the proximal opening of each of the protuberances lies.

In a further embodiment, the sheet has an inner face and an outer face, and all the protuberances thrust outwardly in the direction of the outer face. The inner face includes the innersides of the planar portion of the sheet in this embodiment, as well as the innersides of the plurality of protuberances. The outer face includes the outersides of the planar portion of the sheet—if any—and the outersides of the plurality of protuberances. This may be contrasted with other embodiments wherein the plurality of protuberances are staggered such that adjacent protuberances thrust in opposite directions, i.e., some in the direction of the inner face and some in the direction of the outer face, but only the latter (outer-facing) set of protuberances have the distal openings for air pruning.

BRIEF DESCRIPTION OF THE DRAWINGS

So that the above recited features and advantages of the present invention can be understood in detail, a more particular description of the invention, briefly summarized above, may be had by reference to the embodiments thereof that are illustrated in the appended drawings. It is to be noted, however, that the appended drawings illustrate only typical embodiments of this invention and are therefore not to be considered limiting of its scope, for the invention may admit to other equally effective embodiments.

DESCRIPTION OF THE PREFERRED EMBODIMENTS

The roots of a plant grow and extend in somewhat analogous fashion to the path of a projectile such as a bullet. Thus, a root will extend in a naturally promoted direction (i.e., downwardly and outwardly) until it strikes something that it cannot move or penetrate. At that point, the root is deflected or ricochets in a new direction and extends until it encounters something else that would change its direction of growth or travel. The present invention utilizes boundary-forming sheets having multiple protuberances that mimic the natural root path so as to minimize ricocheting or direction changes that lead the root away from openings that serve to air prune the root. Thus, the protuberances employed by sheets according to the present invention receive many roots without any ricocheting, and also directs root ricocheting—if any occurs—towards the air-pruning openings.

In this manner, the protuberances are well adapted for engaging or intercepting the roots of a plant such as a container-grown plant at the earliest opportunity, while such roots are extending in a generally outwardly and downwardly direction, and directing such roots towards distal openings that serve to air-prune the root tips and stimulate further root branching. This may be contrasted with prior art plant containers, such as smooth-walled containers of the type shown in FIG. 1, that inhibit the growth of lateral root tips at all levels in a plant growth medium because the roots that contact the container sidewall are deflected and circle aimlessly.

Figures 3A, 3B:
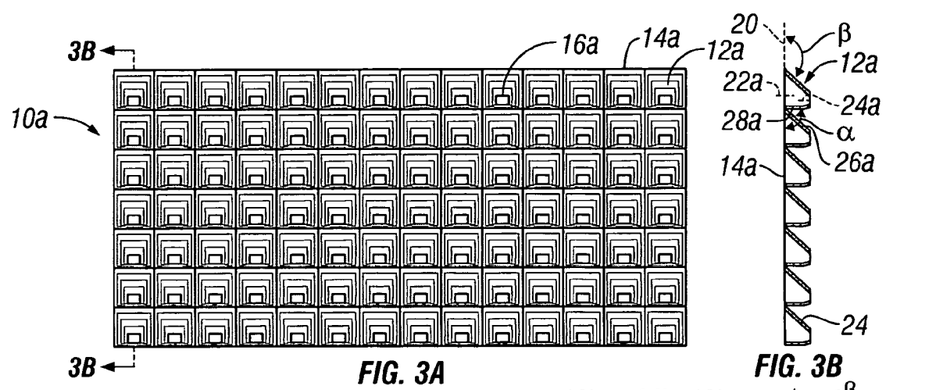
FIGS. 3A and 3B are front and side views of a sheet adapted for forming a plant container in accordance with one embodiment of the present invention.
Figures 4A, 4B:
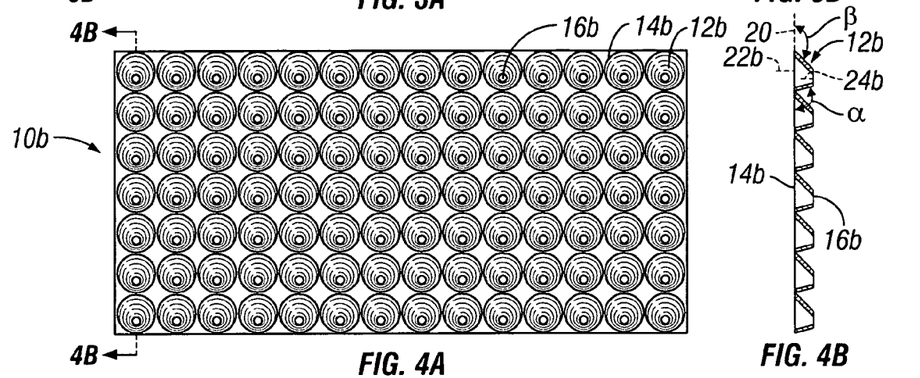
FIGS. 4A and 4B are front and side views of a sheet adapted for forming a plant container in accordance with another embodiment of the present invention.
Figures 5A, 5B:
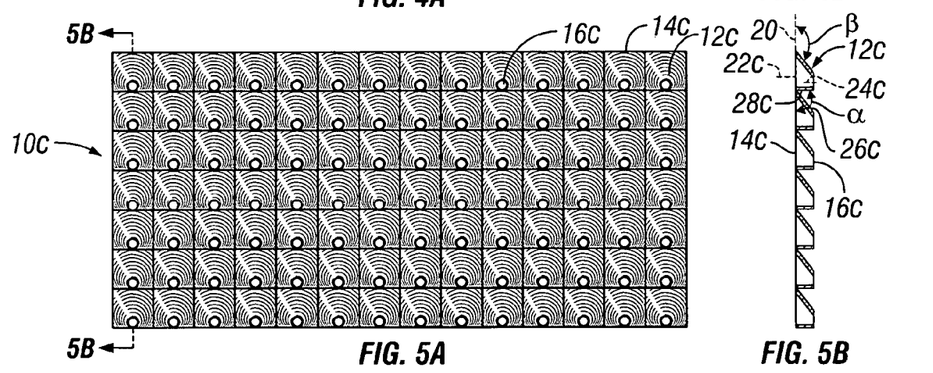
FIGS. 5A and 5B are front and side views of a sheet adapted for forming a plant container in accordance with a further embodiment of the present invention.
Figure 6:
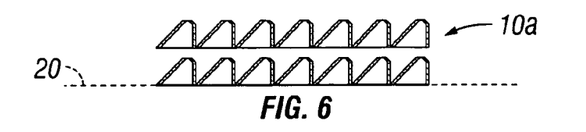
FIG. 6 is a side view of two sheets oriented for stacking, or overlapping, in accordance with the embodiment shown in FIGS. 3A and 3B.

Referring now to FIGS. 3-5, the present invention employs a sheet 10a-c having a plurality of protuberances 12a-c, respectively, formed thereon over substantially the entire surface of the sheet. Each protuberance 12a-c is defined by a proximal opening 14a-c that communicates with a distal opening 16a-c, respectively, as illustrated in the side views of FIGS. 3B, 4B and 5B. Each protuberance generally slopes downwardly when the sheet is positioned upright. Preferably, the center 22a-c of the proximal opening 14a-c is positioned higher than the center 24a-c of the distal opening 16a-c when the sheet is positioned upright, ensuring that the pathway provided by the protuberances mimics that natural downward and outward growth tendency of the plant roots.

Preferably, the proximal opening 14 of each protuberance 12 has a larger cross-sectional area than the distal opening 16 thereof, and each of the protuberances narrows in width from the proximal opening to the distal opening, so as to assist in directing root extension towards the distal opening, in funnel-like fashion. This narrowing may be in a substantially linear fashion, such as in conically-shaped (see FIGS. 4-5) or pyramidally-shaped protuberances (see FIGS. 3A-3B). This narrowing may also be substantially curvilinear, such as in a hemispherically-shaped protuberances (not shown).

The openings of the protuberances may also employ different shapes. For example, the proximal opening may be substantially rectangular, substantially circular, or irregular in shape. Similarly, the distal opening may be substantially rectangular, substantially circular, or irregular in shape. Thus, the sheet embodiment shown in FIGS. 3A-3B employs square-shaped proximal and distal openings; the sheet embodiment shown in FIGS. 4A-4B employs circular proximal and distal openings; and the sheet embodiment shown in FIGS. 5A-5B employs square proximal openings with round distal openings.

The protuberances 12 may also employ different profiles. For example, the protuberances may have a lower profile 28c that is substantially horizontal (see FIGS. 5A-5B), a lower profile 28b that slopes upwardly at an angle β that exceeds 90 degrees measured from the plane of the sheet (see FIGS. 4A-4B), or a lower profile 28a that combines horizontal and sloped surfaces (see FIGS. 3A-3B). Furthermore, the protuberances may have an upper profile 26a-c that slopes downwardly at an angle α in the range of approximately 110 to 150 degrees measured from the plane of the sheet (see, e.g., FIGS. 3-5).

It is further preferred that the protuberances 12 all thrust outwardly from a flat plane, as illustrated by plane 20 in FIGS. 3-7. The air-root pruning openings are defined by distal openings 16a-c. In a particularly preferred embodiment shown in FIGS. 3A-3B, the protuberances begin as square-shaped proximal openings 14b one to two inches wide by one to two inches tall (but various squares or rectangles would work as well and the size of the squares or rectangles could be any of a range of sizes). The bottom of the resulting pyramidal protuberance defines the lower profile 28b and extends outwardly such that the lower profile is nearly horizontal and during use would be nearly perpendicular to the plane 20 of the sheet 10b, typically parallel with the ground on which the resulting container 1 is setting. The top of the pyramidal protuberance defines the upper profile 26a and extends downwardly and outwardly at a steep angle α of approximately 150 degrees measured from the plane 20 of the sheet 10. The two sides of the pyramidal-shaped protuberance extend outwardly to complement the top and bottom walls of the protuberance. The terminal ends of the four sides come together to create the distal opening for air-root pruning, which distal openings may be any shape or size desired, but a rectangular opening approx. ¼ inch wide by ⅜ inch tall (see FIG. 3A) or a round opening approx. ⅜ inch diameter works well (see FIGS. 7-8).

The sheet design of the present invention takes advantage of the natural geotropism (the downward effect of gravity on roots) and outward extension of plant roots and provides superior capture and guidance of root tips to the distal protuberance openings for air-root pruning. The sheet design of the present invention is much more efficient, compared to other prior art container wall designs, in capturing root tips as they extend outwardly and downwardly and guiding the root tips to the air-root pruning openings. Further, with the present invention, the opportunity for root tips to avoid capture by the first outward protuberance encountered is minimized.

Furthermore, the protuberances may have the same or different angles, shapes, or sizes in order to more closely follow the natural geotropism of a plant. For example, the protuberances in the portion of a sheet 10 outlying the upper region of the growth medium may employ lower profiles that are angled differently than the protuberances in the portion of a sheet 10 outlying the lower region of the growth medium.

A preferred embodiment of the present invention employs a slight rise in the otherwise-horizontal lower profile of the protuberances about ⅔ the distance from the vertical plane 20 to facilitate the sheets being easily nested or stacked for storage and for fastening the overlapping edges of the sheet. Experimental uses of such an embodiment support a conclusion that root guidance is not compromised by this slight rise or lip as roots are, by this point, fully engaged in the protuberance and cannot escape.

In a further embodiment of the present invention (not shown), the lower profile of the protuberances slopes downwardly such that it forms an angle α less than 90 degrees with plane 20. This embodiment is less preferred, however, since it would be somewhat more difficult to form during manufacture, and to store and fasten. As mentioned above, a downward slope of the lower protuberance profile is not essential, and other embodiments such as those employing substantially horizontal lower profiles have shown considerable success in intercepting and directing the roots of a plant—even if the roots are extending outwardly but downwardly at angle of 60 degrees or more from the horizontal.

By contrast, the more the lower profile 28 of the protuberances 12 slope upwardly, the greater the likelihood that the deflection or ricocheting of the root tip will be in some direction other than towards the distal opening 16. It has been observed, however, that a slight upward inclination in the lower profile of the protuberances, especially near their distal openings as described above, will not divert the root tips from being air pruned. In fact, such a slight inclination aids in removal of the sheet from an injection molding die during manufacture, and facilitates easier overlapping or nesting when fastening the sheet edges together to form a cylindrical container. In particular, if the upward slope of the lower profile is formed deep into the projection of the protuberance near the distal opening, there is no opportunity for a root tip to do anything but continue on the path through the protuberance toward the distal opening.

Figure 8:
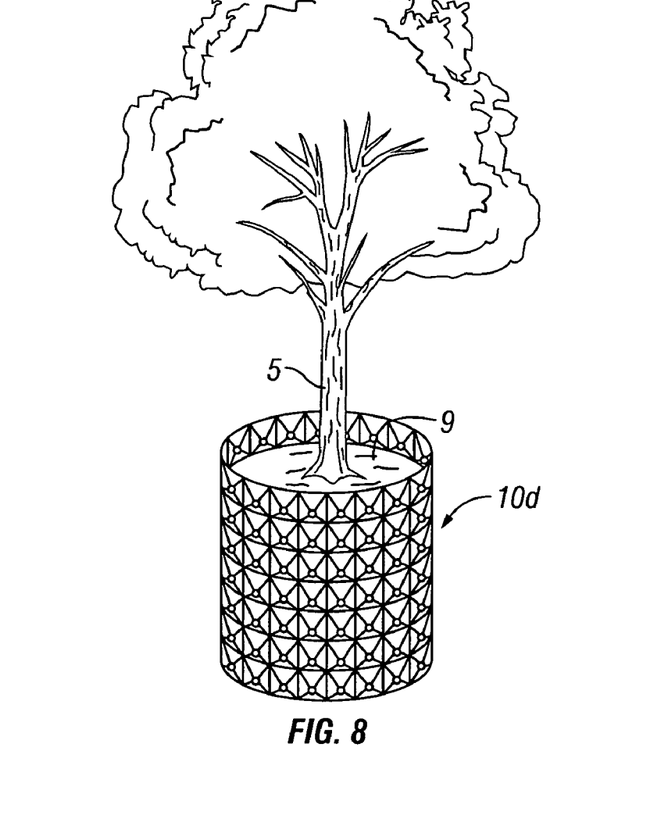
FIG. 8 is a perspective view of a container bounding a volume of soil and a transplantable plant in accordance with the embodiment shown in FIGS. 7A and 7B.

It is further preferred that the sheet 10 is formed of a thin, flexible plastic material and is adapted to be easily manually configured in a generally cylindrical shape, as shown in FIG. 8. Alternatively, sheet 10 could be formed of aluminum or another suitable metal, or of other materials such as a papier-mâché with some fiberglass or other fibers added to provide strength and durability.

The sheet(s) 10 may be manufactured in various ways. For example, the sheets may be hot-pressed or injection-molded. Furthermore, the distal openings may be formed in the same step as the protuberances or the distal openings may be cut or otherwise formed in a step following formation of the protuberances.

It is further preferred that the sheet be either: (a) provided with a fastener(s) to secure the edges of the sheet together when it's formed in the generally cylindrical shape (see, e.g., FIG. 7A); or (b) seamlessly formed in a generally cylindrical shape, such as by injection molding (see the seamless configuration of FIG. 8). The fasteners may include, without limitation, plastic rivets (indicated as 18 in FIG. 7A), staples, adhesive, snaps, clasps, hook and loop fasteners, mortise and tenon joints, and others. Such fasteners are described further in the Applicant's copending patent application Ser. No. 10/062,287 filed Jan. 31, 2002 and in U.S. Pat. No. 4,939,865 issued on Jul. 10, 1990, both of which are incorporated in their entireties herein by reference.

The plurality of protuberances 12 on the sheet 10 preferably forms a lattice over at least a substantial portion of the sheet. It is further preferred that the protuberances are arranged in a close-packed configuration that employs little spacing between adjacent protuberances, which reduces the presence of areas in the sheet that might promote root ricocheting away from the protuberances. This is clearly illustrated in the embodiments of FIGS. 3-5.

Figure 7A:
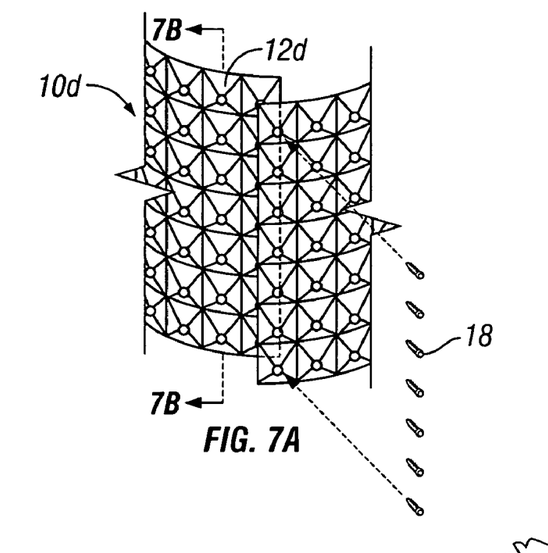
FIG. 7A is a perspective view, partially cut-out, illustrating the overlapping of the edges of a sheet adapted for forming a plant container in accordance with a still further embodiment of the present invention.
Figure 7B:
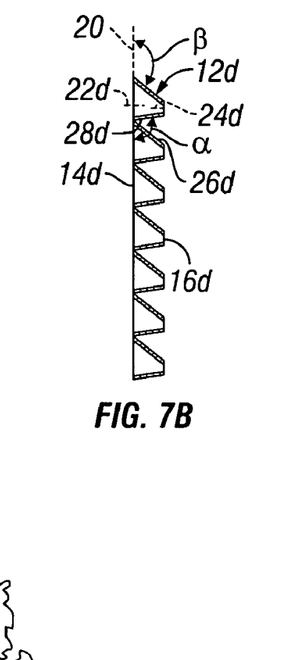
FIG. 7B is a side view of one of the edges of the sheet shown in FIG. 7A.

When the sheet is formed in the generally cylindrical shape by joining the edges of the sheet together, this may be achieved by overlapping one edge over another edge, and securing the edges substantially along the length of the edges (again, see FIG. 7A). Preferably, the overlapping of the edges is guided by the engagement of a lattice of root-directing protuberances in the region adjacent the one edge with a complementary lattice of root-directing protuberances in the region adjacent the other edge, as demonstrated in FIGS. 6 and 7.

The sheet 10 generally defines a plane 20 in which a portion of each of the protuberances lies. Thus, in one embodiment, the sheet defines a plane in which the proximal opening 12 of each of the protuberances lies.

In one embodiment, the sheet has an inner face and an outer face, and all the protuberances thrust outwardly in the direction of the outer face. The inner face includes the innersides of the planar portion of the sheet in this embodiment—if any—as well as the innersides of the plurality of protuberances. The outer face includes the outsides of the planar portion of the sheet—if any—and the outsides of the plurality of protuberances (see FIGS. 3A, 4A, 5A, 7, and 8). This may be contrasted with other embodiments wherein the plurality of protuberances are staggered such that adjacent protuberances thrust outwardly in opposite directions, i.e., some in the direction of the inner face and some in the direction of the outer face, but only the latter (outer-facing) set of protuberances have the distal openings for air pruning (not shown).

In practice, as indicated in FIG. 8, plant containers employing the sheet 10 are placed on a root impervious surface (not indicated) which can be plastic, roofing paper, concrete or other surfaces, then filled with a growth medium 9 and a plant 5 is planted therein. As the plant grows, lateral root branching is maximized by the protuberances 12 as described above and as shown in the accompanying figures. At the end of the growth period prior to transplantation, root tips are thereby provided at all levels of the growth medium, i.e., in a plurality of the distal protuberance openings 16 disposed about sheet 10. The plant is then transplanted from the container to a second, larger container (or the ground) by sheet 10 being unfastened at its fastened edges, and then carefully opened laterally outwardly so as not to damage the root tips, and removed. The space between the original and larger container (or the ground) is then filled with additional growth medium to surround exposed root tips, etc. Once removed, the sheet 10 can be reused to form another container of desired size.

As will be understood, any sized sheet 10 can be utilized to make up a plant container according to the selected plant size. If during the growth of a plant prior to when it is transplanted, it is desirable to increase the size of the container in which the plant is being grown, one or more sheets 10 can be added to the original container sheet by fastening the edges of supplemental sheet(s) to those of the original sheet and placing additional growth medium into the container. Similarly, an original container may comprise one or more sheets fastened horizontally (making a container with a larger diameter) or vertically (making a container that is deeper).

It will be understood from the foregoing description that various modifications and changes may be made in the preferred and alternative embodiments of the present invention without departing from its true spirit. For example, the present invention does not preclude the use of protuberances having no distal openings among the protuberances as described above. Such a combination would affect root trapping as well as root pruning, and is contemplated and encompassed by the present invention.

This description is intended for purposes of illustration only and should not be construed in a limiting sense. The scope of this invention should be determined only by the language of the claims that follow. The term "comprising" within the claims is intended to mean "including at least" such that the recited listing of elements in a claim are an open group. "A," "an" and other singular terms are intended to include the plural forms thereof unless specifically excluded.

What is claimed is:

1. An apparatus, comprising:
a plant container including a sidewall formed by a sheet having a plurality of hollow outwardly extending protuberances;
each of the protuberances having a proximal opening in communication with a distal opening, a center of the proximal opening being positioned higher than a center of the distal opening when the sheet is positioned vertically, wherein the proximal opening of each protuberance is larger than the distal opening.

2. The apparatus of claim 1, wherein the sheet is flexible and adapted to be formed in a generally arcuate shape.

3. The apparatus of claim 2, wherein the sheet is adapted to be formed in a generally cylindrical shape, and further comprising a fastener to secure the edges of the sheet together when formed in the generally cylindrical shape.

4. The apparatus of claim 1, wherein the sheet is seamlessly formed in a generally cylindrical shape.

5. The apparatus of claim 1, wherein the plurality of protuberances form a lattice over at least a substantial portion of the sheet.

6. The apparatus of claim 5, wherein the plurality of protuberances are arranged in a close-packed configuration.

7. The apparatus of claim 1, wherein the sheet defines a plane in which a portion of each of the protuberances lie.

8. The apparatus of claim 7, wherein the sheet defines a plane in which the proximal opening of each of the protuberances lie.

9. The apparatus of claim 8, wherein the sheet has an inner face and an outer face, the inner face defining the plane and the outer face bearing the plurality of protuberances.

10. The apparatus of claim 1, wherein each of the protuberances narrows from the proximal opening to the distal opening.

11. The apparatus of claim 10, wherein each of the protuberances narrows in a substantially linear fashion.

12. The apparatus of claim 10, wherein each of the protuberances narrows in a substantially curvilinear fashion.

13. The apparatus of claim 1, wherein the proximal opening is substantially rectangular in shape.

14. The apparatus of claim 1, wherein the proximal opening is substantially circular in shape.

15. The apparatus of claim 1, wherein the proximal opening is irregular in shape.

16. The apparatus of claim 1, wherein the distal opening is substantially rectangular in shape.

17. The apparatus of claim 1, wherein the distal opening is substantially circular in shape.

18. The apparatus of claim 1, wherein the distal opening is irregular in shape.

19. The apparatus of claim 1, wherein each of the protuberances has a lower profile that is substantially horizontal.

20. The apparatus of claim 1, wherein
the sheet defines a plane in which a portion of each of the protuberances lies, and
each of the protuberances has a lower profile that slopes upwardly at an angle that exceeds 90 degrees measured from the plane.

21. The apparatus of claim 1, wherein
the sheet defines a plane in which a portion of each of the protuberances lies, and
each of the protuberances has an upper profile that slopes downwardly at an angle in the range of approximately 110 to 150 degrees measured from the plane.

22. An apparatus for containing a plant, comprising:
a sheet adapted to be formed in a generally cylindrical side wall and having a plurality of hollow protuberances;
each of the protuberances having a proximal opening in communication with a distal opening and generally depending downwardly and outwardly when the sheet is positioned vertically, wherein the proximal opening is larger than the distal opening.

23. The apparatus of claim 22, wherein the sheet is flexible.

24. The apparatus of claim 23, further comprising a fastener to secure the edges of the sheet together when formed in the generally cylindrical shape.

25. The apparatus of claim 22, wherein the sheet is seamlessly formed in the generally cylindrical shape.

26. The apparatus of claim 22, wherein the plurality of protuberances form a lattice over at least a substantial portion of the sheet.

27. The apparatus of claim 26, wherein the plurality of protuberances are arranged in a close-packed configuration.

28. The apparatus of claim 22, wherein the sheet defines a plane in which a portion of each of the protuberances lie.

29. The apparatus of claim 28, wherein the sheet defines a plane in which proximal opening of each of the protuberances lie.

30. The apparatus of claim 29, wherein the sheet has an inner face and an outer face, the inner face defining the plane and the outer face bearing the plurality of protuberances.

31. The apparatus of claim 22, wherein each of the protuberances narrows from the proximal opening to the distal opening.

32. The apparatus of claim 31, wherein each of the protuberances narrows in a substantially linear fashion.

33. The apparatus of claim 31, wherein each of the protuberances narrows in a substantially curvilinear fashion.

34. The apparatus of claim 22, wherein the proximal opening is substantially rectangular in shape.

35. The apparatus of claim 22, wherein the proximal opening is substantially circular in shape.

36. The apparatus of claim 22, wherein the proximal opening is irregular in shape.

37. The apparatus of claim 22, wherein the distal opening is substantially rectangular in shape.

38. The apparatus of claim 22, wherein the distal opening is substantially circular in shape.

39. The apparatus of claim 22, wherein the distal opening is irregular in shape.

40. The apparatus of claim 22, wherein each of the protuberances has a lower profile that is substantially horizontal.

41. The apparatus of claim 22, wherein
the sheet defines a plane in which a portion of each of the protuberances lies, and
each of the protuberances has a lower profile that slopes upwardly at an angle that exceeds 90 degrees measured from the plane.

42. The apparatus of claim 22, wherein
the sheet defines a plane in which a portion of each of the protuberances lies, and
each of the protuberances has a upper profile that slopes downwardly at an angle in the range of approximately 110 to 150 degrees measured from the plane.

43. An apparatus for promoting air-root pruning of a plant, comprising:
a sheet adapted to be formed in a generally cylindrical shape wall and having a plurality of hollow, root-directing protuberances;
each of the protuberances having an inner opening in communication with an outer opening and generally depending downwardly and outwardly when the side wall sheet is positioned vertically, wherein the inner openings is larger than the outer opening;

whereby the roots of a plant positioned in a growth medium within the sheet, when formed in the generally cylindrical side wall, are directed through the inner and outer openings of at least one protuberance into open air outside the sheet, inhibiting growth of exposed tips of the roots.

44. The apparatus of claim 43, wherein the sheet is flexible.

45. The apparatus of claim 44, further comprising a fastener to secure the edges of the joined sheet together when formed in the generally cylindrical shape.

46. The apparatus of claim 43, wherein the sheet is seamlessly formed in the generally cylindrical shape.

47. The apparatus of claim 43, wherein the plurality of protuberances form a lattice over at least a substantial portion of the sheet.

48. The apparatus of claim 47, wherein the plurality of protuberances are arranged in a close-packed configurations.

49. The apparatus of claim 43, wherein the sheet defines a plane in which a portion of each of the protuberances lie.

50. The apparatus of claim 49, wherein the sheet defines a plane in which the inner opening of each of the protuberances lie.

51. The apparatus of claim 50, wherein the sheet has an inner face and an outer face, the inner face defining the plane and the outer face bearing the plurality of protuberances.

52. The apparatus of claim 43, wherein the sheet is formed in the generally cylindrical shape by joining edges of the sheet together.

53. The apparatus of claim 52, wherein the edges of the sheet are joined together by overlapping one of the edges over the other of the edges, and securing the one edge over the other edge substantially along a length of the edges.

54. The apparatus of claim 47, wherein the sheet is formed in the generally cylindrical shape by joining edges of the sheet together via overlapping one of the edges over the other of the edges, and securing the one edge over the other edge substantially along a length of the edges, the overlapping of the edges being guided by the engagement of root-directing protuberances in the lattice region adjacent the one edge with root-directing protuberances in the lattice region adjacent the other edge.

55. The apparatus of claim 54, wherein
the sheet defines a plane in which a portion of each of the root-directing protuberances lies, and
each of the root-directing protuberances has a lower profile that slopes upwardly at an angle that exceeds 90 degrees measured from the plane, thereby facilitating the engagement by stacking of the root-directing protuberances, one-over-the-other, as the edges overlap.

56. The apparatus of claim 52, wherein the edges of the sheet are joined together by making tip mortise and tenon joints formed in the edges.

57. The apparatus of claim 43, wherein the sheet is comprised of a thin, plastic material.

58. The apparatus of claim 43, wherein each of the protuberances narrows from the inner opening to the outer opening.

59. The apparatus of claim 58, wherein each of the protuberances narrows in a substantially linear fashion.

60. The apparatus of claim 58, wherein each of the protuberances narrows in a substantially curvilinear fashion.

61. The apparatus of claim 43, wherein the inner opening is substantially rectangular in shape.

62. The apparatus of claim 43, wherein the inner opening is substantially circular in shape.

63. The apparatus of claim 43, wherein the inner opening is substantially irregular in shape.

64. The apparatus of claim 43, wherein the outer opening is substantially rectangular in shape.

65. The apparatus of claim 43, wherein the outer opening is substantially circular in shape.

66. The apparatus of claim 43, wherein the outer opening is substantially irregular in shape.

67. The apparatus of claim 43, wherein each of the protuberances has a lower profile that is substantially horizontal.

68. The apparatus of claim 43, wherein
the sheet defines a plane in which a portion of each of the protuberances lies, and
each of the protuberances has a lower profile that slopes upwardly at an angle that exceeds 90 degrees measured from the plane.

69. The apparatus of claim 43, wherein
the sheet defines a plane in which a portion of each of the protuberances lies, and
each of the protuberances has a upper profile that slopes downwardly at an angle in the range of approximately 110 to 150 degrees measured from the plane.

70. The apparatus of claim 22, wherein the downwardly and outwardly depending protuberances are disposed at an angle that mimics that natural downward and outward growth tendency of the plant roots.

71. The apparatus of claim 1, wherein the sheet further comprises additional protuberances that have a different angle, shape or size than the plurality of protuberances.

72. The apparatus of claim 22, wherein the sheet further comprises additional protuberances that have a different angle, shape or size than the plurality of protuberances.

73. The apparatus of claim 43, wherein the sheet further comprises additional protuberances that have a different angle, shape or size than the plurality of protuberances.

* * * * *